(12) United States Patent
Ugajin et al.

(10) Patent No.: US 6,268,869 B1
(45) Date of Patent: Jul. 31, 2001

(54) APPARATUS AND METHOD FOR PROCESSING AN IMAGE DISPLAY AND A READABLE STORAGE MEDIUM STORING A COMPUTER PROGRAM

(75) Inventors: Masashi Ugajin, Suginami-ku; Kenji Miura, Ichihara, both of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/069,690

(22) Filed: Apr. 29, 1998

(30) Foreign Application Priority Data

May 6, 1997 (JP) .................................................. 9-115830

(51) Int. Cl.[7] .................................................... G06F 15/00
(52) U.S. Cl. .......................... 345/433; 345/112; 345/473; 345/474; 345/428
(58) Field of Search ...................... 345/433, 473, 345/474, 949, 441, 428

(56) References Cited

U.S. PATENT DOCUMENTS

| 5,384,908 | * | 1/1995 | Mackinlay et al. ................... 395/152 |
| 5,657,433 | * | 8/1997 | Murase et al. ........................ 395/133 |
| 5,680,533 | * | 10/1997 | Yamato et al. ....................... 395/173 |
| 5,724,499 | * | 3/1998 | Nishiyama et al. .................. 395/173 |
| 5,977,985 | * | 11/1999 | Ishii et al. ............................. 345/433 |

FOREIGN PATENT DOCUMENTS

| 550244 | 7/1993 | (EP) . |
| WO9613808 | 5/1996 | (WO) . |

* cited by examiner

*Primary Examiner*—Matthew Luu
*Assistant Examiner*—Daniel J Chung
(74) *Attorney, Agent, or Firm*—Jordan and Hamburg LLP

(57) ABSTRACT

An image display processing apparatus, includes an issuance unit for issuing a display content of one frame including images of a plurality of objects to be displayed on a screen, a monitoring unit for detecting a display content having a data amount in excess of a predetermined value, a selection unit for selecting at least one of the plurality of objects included in the display content, and an image processing unit for processing an image for the display content excluding the image of the object selected by the selection unit and displaying the processed image on the screen.

18 Claims, 7 Drawing Sheets

FIG. 5

| | COORD TRANS PROCES DATA | LIGHT SOURCE CAL PROCES DATA | COLOR PALET ADR DATA | TEXTURE ADR DATA | No. | STATE FLAG |
|---|---|---|---|---|---|---|
| OBJECT A1 | ... | ... | ... | ... | 9 | 1 |
| OBJECT A2 | ... | ... | ... | ... | 8 | 0 |
| OBJECT A3 | ... | ... | ... | ... | 7 | 0 |
| OBJECT A4 | ... | ... | ... | ... | ... | ... |
| OBJECT A9 | ... | ... | ... | ... | 1 | 0 |

5a

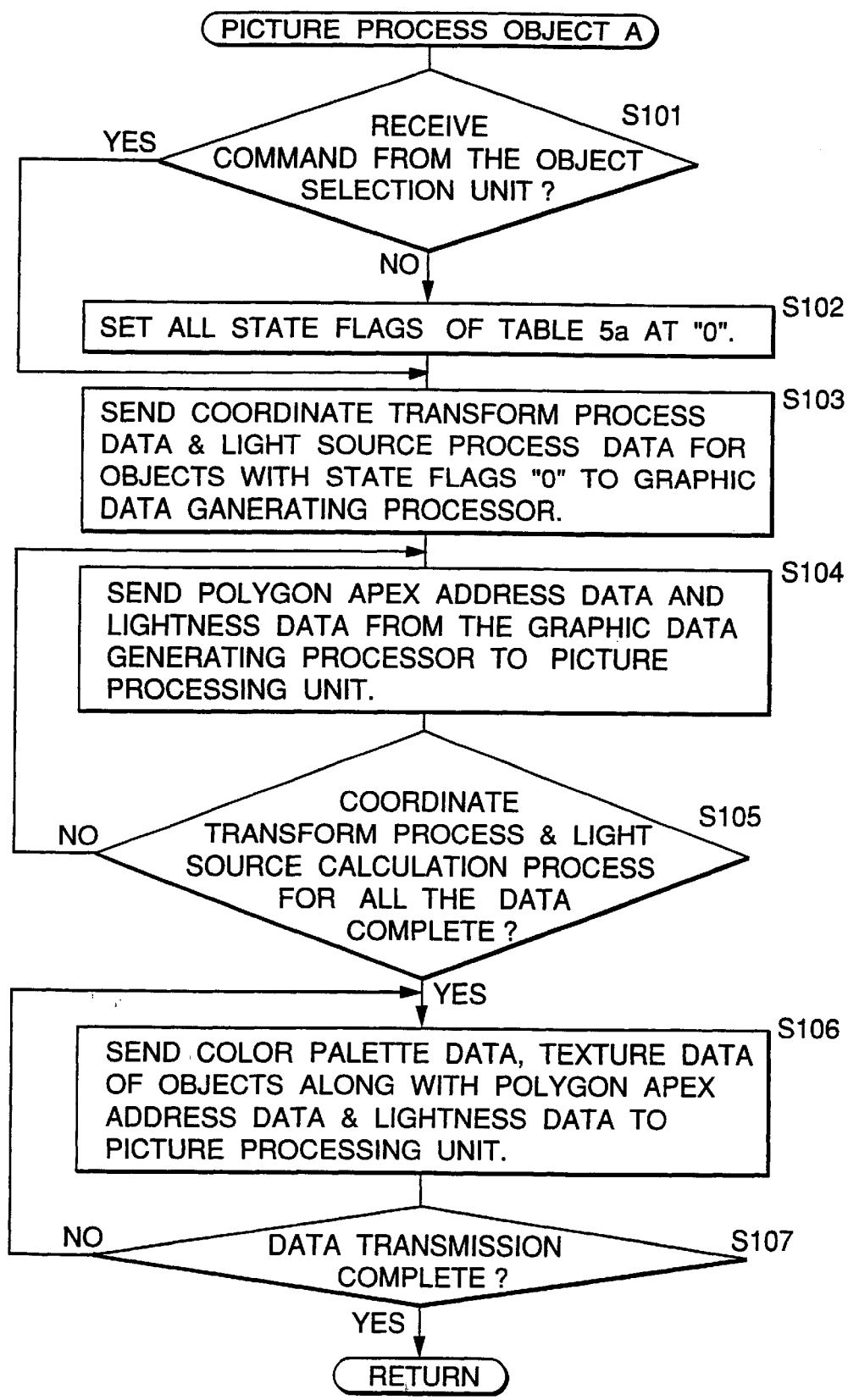

APPARATUS AND METHOD FOR PROCESSING AN IMAGE DISPLAY AND A READABLE STORAGE MEDIUM STORING A COMPUTER PROGRAM

BACKGROUND OF THE INVENTION

The present invention relates to an image display processing apparatus for displaying a display content including a plurality of objects frame by frame on a screen, an image display processing method and a readable storage medium storing a computer program.

In recent years, there have been known video game machines which display a game image in which an object such as a person, a machine, a tree or a rock arranged in a virtual three-dimensional game space is displayed on a monitor. In such video game machines, the object arranged in the game space is formed as an aggregate of a plurality of polygons. The video game machines generally perform the following processing to display the object on the monitor.

Specifically, the video game machine obtains the positions of the respective polygons in three-dimensional coordinate systems defining the game space, expresses the surface of the object by pasting textures to the respective polygons whose positions have been obtained, and displays the object colored based on a color palette data on the monitor. Accordingly, a real looking image of the object is displayed on the monitor.

The video game machine displays several tens of frames of still images on the display surface for a second by repeating the aforementioned processing several tens of times per second. At this time, if the position of the object is gradually changed, the movement of the object can be displayed in an animated manner.

In recent years, there has been a tendency to express the detailed surface configuration of, e.g. the object by forming the background and the object of the game space using fine polygons. As the polygons are made finer, the number of polygons forming the object or the like tends to be increased.

However, an increase in the number of the polygons causes the following problem. Specifically, an increase in the number of the polygons forming the object means an increase in a total data amount (display data) of the display content of one frame. There has been a limit in the total amount of the display data of one frame which can be processed by the game machine. Accordingly, in the case that the number of the objects to be displayed in one frame is large, the total amount of the display data sometimes exceeds a processing limit of the video game machine. This has resulted in the flickering of the screen or so-called twisting of the screen by the blinking of the objects displayed on the monitor.

SUMMARY OF THE INVENTION

In view of the above problem, it is an object of the present invention to provide an apparatus and a method for processing an image display which can suppress a display data amount of one frame within a range processable by a video game machine and can prevent the blinking of objects, twisting of a screen and the like, and also to provide a readable storage medium storing a computer program.

The invention adopts the following construction to solve the aforementioned problem. Specifically, the invention is directed to an image display processing apparatus which comprises issuance means for issuing a display content of one frame including images of a plurality of objects to be displayed on a screen; monitoring means for detecting a display content having a data amount in excess of a predetermined value; selection means for selecting at least one of the plurality of objects included in the display content; and image processing means for processing an image for the display content excluding the image of the object selected by the selection means and displaying the processed image on the screen.

With the above construction, the monitoring means monitors whether or not the data amounts of the display contents issued by the issuance means exceed the predetermined value. In the case of detecting the display content whose data amount exceeds the predetermined value, the selection means selects at least one of the plurality of objects included in the detected display content. Then, the image processing means applies the image processing to the detected display content excluding the image of the selected object and the processed display content is displayed on the screen. Accordingly, a processing load on the image display processing apparatus can be reduced by the image data of the selected object. Therefore, the data amount of the display content can be suppressed within the range processable by the image display processing apparatus.

These and other objects, features and advantages of the present invention will become more apparent upon a reading of the following detailed description and accompanying drawings.

BRIEF DESCRIPTION OF THE DRAWINGS

FIG. 5 is a diagram of a table shown in FIG. 4, and FIGS. 6 and 7 are flowcharts showing an image display processing by the video game machine.

DETAILED DESCRIPTION OF THE PREFERRED EMBODIMENTS OF THE INVENTION

Hereafter, one embodiment of the invention is described with reference to the accompanying drawings.

[Construction of the Video Game Machine]

Figure 1:
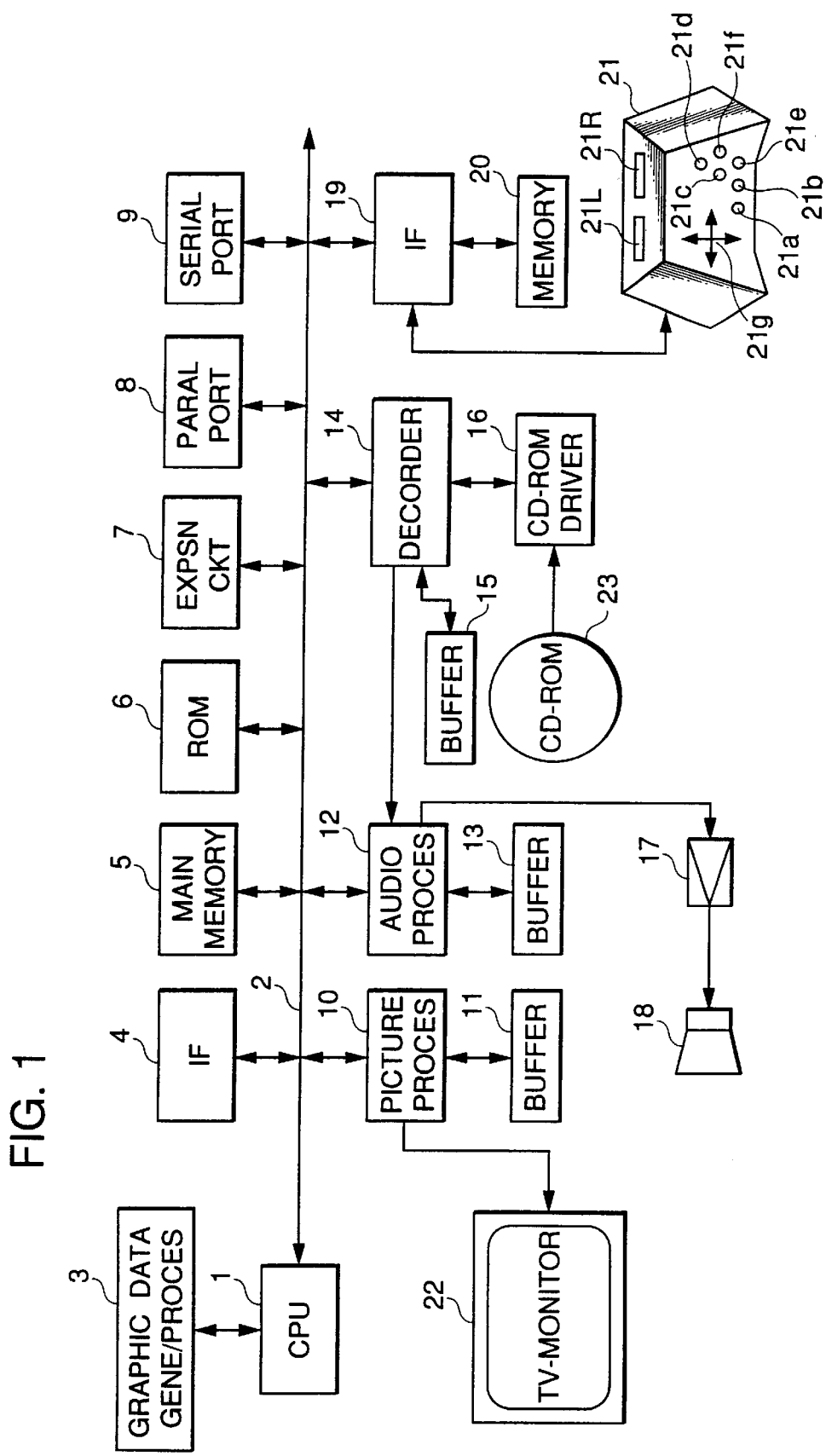
FIG. 1 is a block diagram of a video game machine equipped with an image display processing apparatus according to one embodiment of the invention.

First, the construction of a video game machine equipped with an image display processing apparatus according to this embodiment is described. FIG. 1 is a block diagram showing the entire construction of the video game machine. In FIG. 1, the video game machine is comprised of a machine main body and a controller 21. The machine main body is internally provided with a CD-ROM 23 which is a readable storage medium storing an image data, an audio data and/or a game program, and is connected with a monitor 2.

The machine main body includes a CPU 1, a graphic data generator/processor 3 directly connected with the CPU 1, an interface circuit 4 connected with the CPU 1 via a bus 2 (address bus, data bus and control bus), a main memory 5, a ROM 6, an expansion circuit 7, a parallel port 8, a serial port 9, a picture processor 10, an audio processor 12, a decoder 14, an interface circuit 19, a buffer 11 connected with the picture processor 10, a buffer 13 and an amplifying circuit 17 connected with the audio processor 12, a loudspeaker 18 connected with the amplifying circuit 17, a buffer 15 connected with the decoder 14, a CD-ROM driver 16, and a memory 20 connected with the interface circuit 19. The aforementioned controller 21 and monitor 22 are connected with the interface circuit 19 and with the picture processor 10, respectively.

The graphic data generator/processor 3 plays a roll as a so-called processor of the CPU 1. Specifically, the graphic data generator/processor 3 performs a coordinate transform and a light source calculation and parallelly performs calculations of matrices and vectors of the fixed decimal mode. The coordinate transform is such a processing as to obtain an address of an image to be processed which is fed from the CPU 1 in a display area based on the coordinate data of the respective apices of the image to be processed, a movement amount data and a rotation amount data thereof in a two-dimensional plane or a three-dimensional space and to feed the obtained address to the CPU 1. The light source calculation is such a processing as to calculate the lightness of the image based on a vector data of rays, a normal line data representing the orientation of the surfaces of the polygons and data representing the colors of the surfaces.

The interface circuit 4 is provided for a peripheral device: a pointing device such as a mouse or a track ball. The ROM 6 stores a program data as an operation system of the machine main body. The ROM 6 corresponds to a BIOS (basic input/output system) of a personal computer. The main memory 5 is used to load a game program and a variety of data from the CD-ROM 23.

The expansion circuit 7 expands an image data compressed by the intra-coding method in accordance with the MPEG (moving picture engineering group) and JPEG (joint picture engineering group). The expansion includes decoding (decoding of a data encoded by a VLC: variable length code), reverse quantization, IDCT (inverse discrete cosine transform, restoration of an intra-image, etc.

The picture processor 10 applies a picture processing for the buffer 11 in accordance with a picture command issued from the CPU 1. The buffer 11 includes a display area and a non-display area. The display area is a development area of a data to be displayed on a display surface of the television monitor 22, and the non-display area is a storage area for a texture data and a color palette data. The texture data is a two-dimensional image data, whereas the color palette data is a data for designating a color of the texture data or the like. The CPU 1 reads the texture data and the color palette data from the CD-ROM 23 once or a plurality of times according to the progress of the game, and stores them in the non-display area of the buffer 11.

The picture commands include, for example, a picture command for displaying a line, a picture command for picturing an image of a solid object using polygons and a picture command for picturing a usual two-dimensional image. Here, the polygon is a polygonal two-dimensional image, and the respective apices of the polygonal image are referred to as polygon apices. An object displayed on the display surface of the television monitor 22 in a pseudo three-dimensional manner is normally formed as an aggregate of a plurality of polygons.

The picture command for drawing a line is comprised of a data representing line drawing start and end addresses and a data representing a color and a line image. This command is directly issued from the CPU 1 to the picture processor 10.

The picture image for picturing the image of the solid object using the polygons is comprised of a polygon apex address data representing addresses of the respective apices of the polygons forming the object in the display area of the buffer 11, a texture address data representing the stored positions of the texture data to be adhered to the polygons in the non-display area of the buffer 11, a color palette address data representing the stored positions of the color palette data of the colors of the texture data in the non-display area of the buffer 11, and a lightness data representing the lightness of the textures. The polygon apex address data is a coordinate data obtained by applying a coordinate transform to an absolute coordinate data of the polygon apices in the virtual three-dimensional space which is received from the CPU 1 based on the movement amount data and rotation amount data received from the CPU 1.

Further, the picture command for picturing a usual two-dimensional image is comprised of an apex data, a texture address data, a color palette address data and the lightness data representing the lightness of the texture. The apex data is a coordinate data obtained by the graphic data generator/processor 3 applying a coordinate transform to an apex coordinate data in a plane received from the CPU 1 based on the movement amount data received from the CPU 1.

The audio processor 12 converts a PCM audio data read from the CD-ROM 23 into an ADPCM data. The ADPCM data processed by the audio processor 12 is made audible via the loudspeaker 18.

The CD-ROM driver 16 reads the game program, data such as a map information, the image data and the audio data from the CD-ROM 23 and feeds the read game program and data to the decoder 14.

The decoder 14 applies an error correction to the reproduced data from the CD-ROM driver 16 by an ECC (error correction code), and feeds the resulting data to the main memory 5 or the audio processor 12.

The memory 20 is a card type memory for storing a variety of parameters during the interruption of the game in order to keep the game interrupted.

The controller 21 is provided with a cross key 21g as an assembly of left-, right, up- and down-keys, a left button 21L, a right button 21R, a start button 21a, a selection button 21b, first to fourth buttons 21c to 21f. The cross key 21g is used by a game player to give a command representing a movement to the above, the below, the left or the right to the CPU 1.

The start button 21a is used by the game player to instruct the CPU 1 to start the implementation of the game program loaded from the CD-ROM 23. The selection button 21b is used by the game player to instruct a variety of selections concerning the game program loaded in the main memory 5 to the CPU 1. The functions of the left button 21L, the right button 21R, and the first to fourth buttons 21c to 21f differ depending upon the game program loaded from the CD-ROM 23.

The video game machine described above summarily operates as follows. Specifically, in the case that the machine main body is equipped with the CD-ROM 23, the CPU 1 instructs the CD-ROM driver 16 to read the image data, the audio data, the game program and a variety of data from the CD-ROM 23 in accordance with an operating system stored in the ROM 6 upon the application of power to the machine main body. The CD-ROM driver 16 in turn reads the image data, the audio data, the game program data and other data from the CD-ROM 23 and feeds them to the decoder 14. The decoder 14 applies the error correction to the received image data, audio data, game program, etc.

The image data processed by the decoder 14 is fed to the expansion circuit 7 via the bus 2. The expansion circuit 7 expands the received image data, and feeds the expanded image data to the picture processor 10. The picture processor 10 writes the received image data in the non-display area of the buffer 11. The audio data processed by the decoder 14 is fed to the main memory 5 or the audio processor 12 via the bus 2 to be written in the main memory 5 or the buffer 13. The game program processed by the decoder 14 is fed to the main memory 5 via the bus 2 to be written therein.

Hereafter, the CPU 1 develops the game in accordance with the game program stored in the main memory 5 or a command the player inputs via the controller 21. Specifically, the CPU 1 suitably performs an image processing control, an audio processing control, an internal processing control or like control in accordance with the game program or an instruction content from the game player. The image processing control includes the issuing of a coordinate transform command to the graphic data generator/processor 3, of a light source calculation command, and of a variety of picture commands to the picture processor 10. The audio processing control includes, for example, the issuing of an audio output command to the audio processor 12 and the designation of the level or reverberation. The internal processing control includes, for example, a calculation according to the operation of the controller 21.

Here, as an example of the image processing control, an operation in the case that an image of a solid object using polygons is displayed on the television monitor 22 is described. First, a table storing the absolute coordinate data of the polygons forming the object, the rotation amount data of the object and the movement amount data of the object is generated in the main memory 5. A table storing the aforementioned texture address data and color palette address data is generated.

Subsequently, the CPU 1 reads the rotation amount data and movement amount data of the object and the absolute coordinate data of the polygons from the above table and transfers them to the graphic data generator/processor 3. Then, the graphic data generator/processor 3 converts the absolute coordinate data of the polygons into a polygon apex address data based on the received rotation amount data and movement amount data of the object, and transfers the generated polygon apex address data to the CPU 1.

Subsequently, the CPU 1 reads the texture address data and the color palette address data from the above table and transfers these data and the polygon apex address data to the picture processor 10.

The picture processor 10 then sets a polygon surface range (range enclosed by straight lines connecting the apices of the polygons) in the display area of the buffer 11 based on the polygon apex address data. Subsequently, the picture processor 10 reads the texture data and the color palette data corresponding to the polygon apex address data from the non-display area of the buffer 11 based on the texture address data and the color palette address data, and writes the read picture data in the set polygon surface range. This processing is generally referred to as "texture pasting". In this way, the display image data of the object is stored in the display area of the buffer 11. The picture processor 10 outputs the content (display image data) stored in the display area of the buffer 11 to the television monitor 22.

Figure 2:
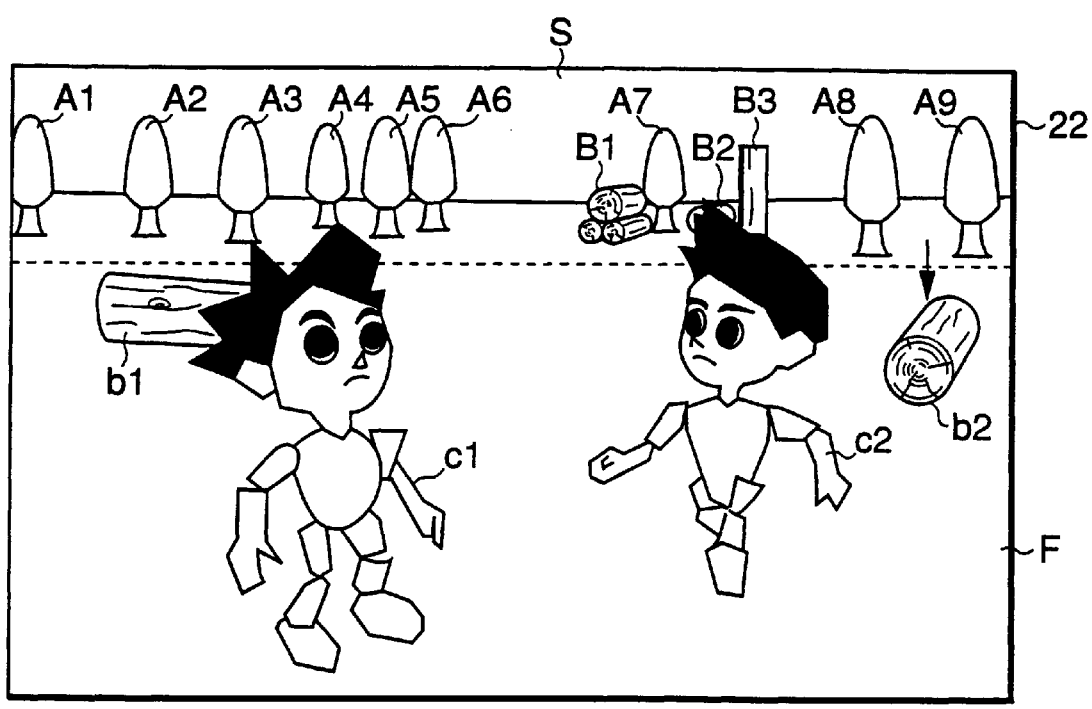
FIG. 2 is a diagram showing a display example of a game screen displayed on a television monitor by the video game machine shown in FIG. 1, FIGS. 3A to 3D are diagrams showing an image display processing method.

Next, the image display processing method by the above video game machine is described. FIG. 2 is a diagram showing an example of an image on the game screen displayed on the television monitor 22 by the video game machine implementing the game program stored in the CD-ROM 23. FIGS. 3A to 3D show an area above a broken line in the game screen shown in FIG. 2 at every elapse of one frame.

In the game screen shown in FIG. 2 is displayed a virtual three-dimensional game space. Specifically, a planar field F is displayed in a position assumed to be the bottom surface of the game space, and a sky S is displayed at the back of the field F with a horizon between the sky S and the field F. On the field F are displayed images of objects C1, C2 representing human type characters which can be operated by the game player and images of objects b (objects b1, b2 are shown in FIG. 2) representing logs. Along the horizon of the field F are displayed images of objects A (objects A1 to A9 are shown in FIG. 2) representing trees and images of objects B1 to B3 representing logs in such a manner as to construct the background of the game screen. These objects A1 to A9, B1 to B3, b1, b2, C1, C2 are displayed in a pseudo three-dimensional manner using the polygons.

This video game is such an action game that the game player operates one character to pick the object b and to throw it to his opponent character and the game player who has made the opponent character's damage resistance scale become 0 is a winner. This game is briefly set as follows. In the aforementioned game screen, the field F, the sky S, the objects A1 to A9, B1 to B3 are continuously displayed in their fixed state during the game (while the game screen shown in FIG. 2 is displayed). On the other hand, the objects b representing logs are suitably newly fallen from above the game space. The objects b, having been struck against the objects C1, C2, are erased from the game screen.

Let it be assumed that a total display data amount of one frame exceeds a level processable by the video game machine, for example, due to the object b2 having fallen on the field F of the game space in the game screen shown in FIG. 2. Then, the video game machine erases the image of the object A1 from the display content of the game screen in the next frame as shown in FIG. 3A. In other words, the image of the object A1 is not displayed.

The video game machine does not display the image of the object A2 on the game screen of the second frame as shown in FIG. 3B; does not display the image of the object A8 on the game screen of the third frame as shown in FIG. 3C; and does not display the image of the object A4 on the game screen of the fourth frame as shown in FIG. 3D. In this way, any of the objects A1 to A9 is erased one by one from the display content of the game screen.

However, for example, in the case that the object C1 picks the object b2 up and strikes it against the object C2, and object B2 then disappears from the game screen (in the case that the object b2 is erased from the display content of the game screen), a total display data amount of one frame lies within the range processable by the video game machine. In this case, the objects A1 to A9 are all included in the display content of the game screen again and, therefore, are displayed on the game screen.

As described above, in the case that the total display data amount of one frame exceeds the range processable by the video game machine by the new addition of the object b to the display content, the images of the objects A1 to A9 are erased one by one from the display content and are not displayed on the game screen. Thus, the video game machine does not need to perform a processing for the object A to be erased from the display content. Therefore, the total display data amount of one frame can be confined within the range processable by the video game machine.

On the other hand, a plurality of images of the objects A1 to A9 displayed on the game screen are erased one by one from the game screen every frame. The image of each of the objects A1 to A9 appears on the game screen again after the elapse of one frame period (e.g. 1/30 sec. in the case of 30 frames per second). Normally, humans can barely recognize such an erasure of the object image for a very short period. Accordingly, the game player is highly unlikely to notice that the objects A1 to A9 disappear and appear again. Since times during which the respective objects A1 to A9 disappear are shifted frame by frame, the disappearance and reappearance of the respective objects A1 to A9 during a short interval, i.e. the blinking of the respective objects A1 to A9 can be prevented.

Figure 3:
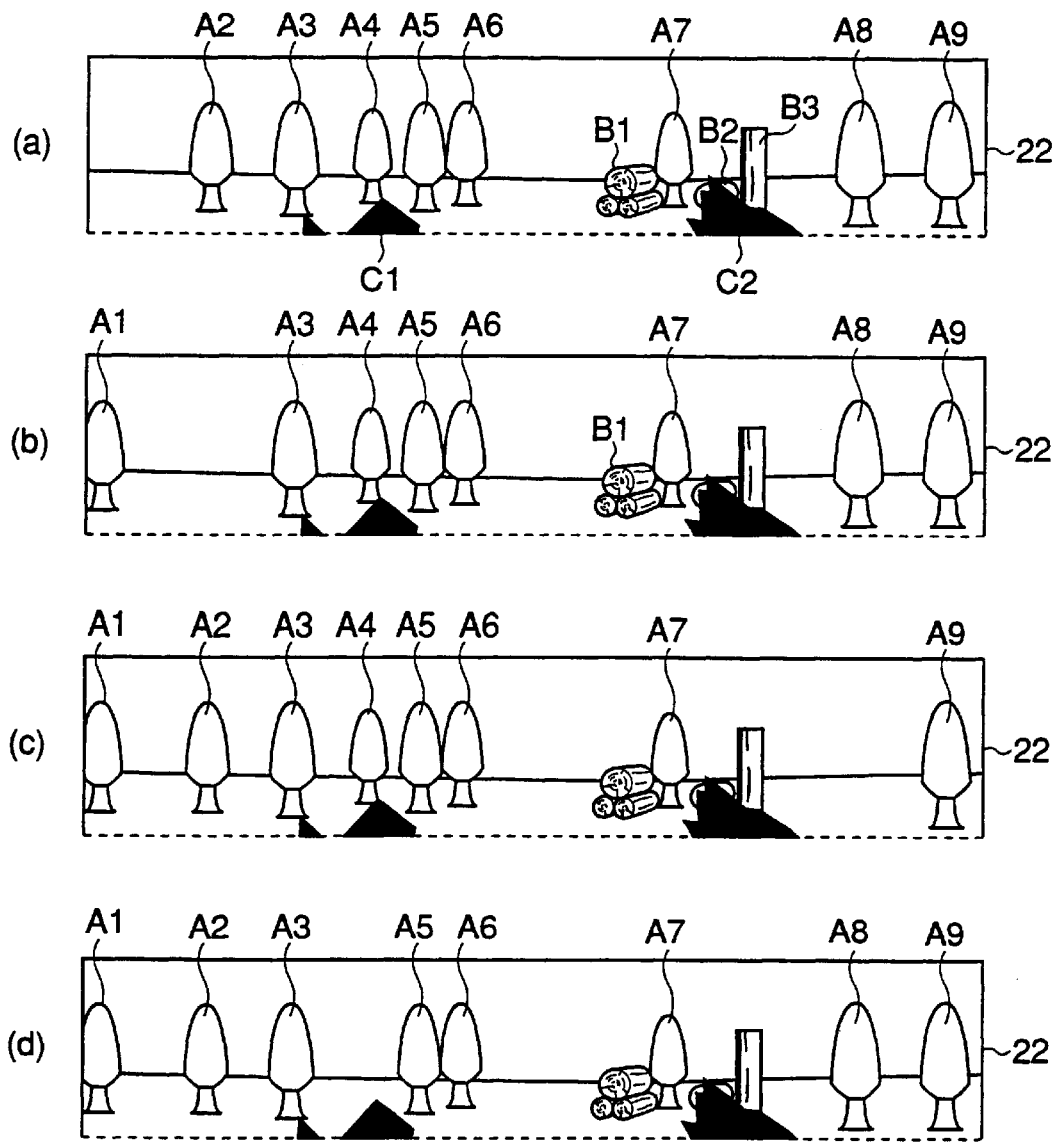

If the setting is such that only the objects A1 to A9, constituting the background of the game screen or like objects which barely influence the development of the game, and the objects located in inconspicuous positions of the game screen, are erased as in the example shown in FIGS. 2 and 3, a possibility that the game player notices the erasure of the object can be further reduced.

Although the images of the same kind of objects, such as the objects A1 to A9 representing trees, are not displayed one by one in the aforementioned example, the shape and color of the object images to be erased may be completely different. For example, it may be set to erase the objects A1 to A9 representing trees and the objects B1 to B3 representing logs one by one. Although the erasing order of the objects can be suitably set, it is desirable to set such that an interval between the frames where the same object is erased is not too short. Further, the objects near the objects operable by the game player (object C1 or C2 representing a character in the above example) may be erased.

Figure 4:
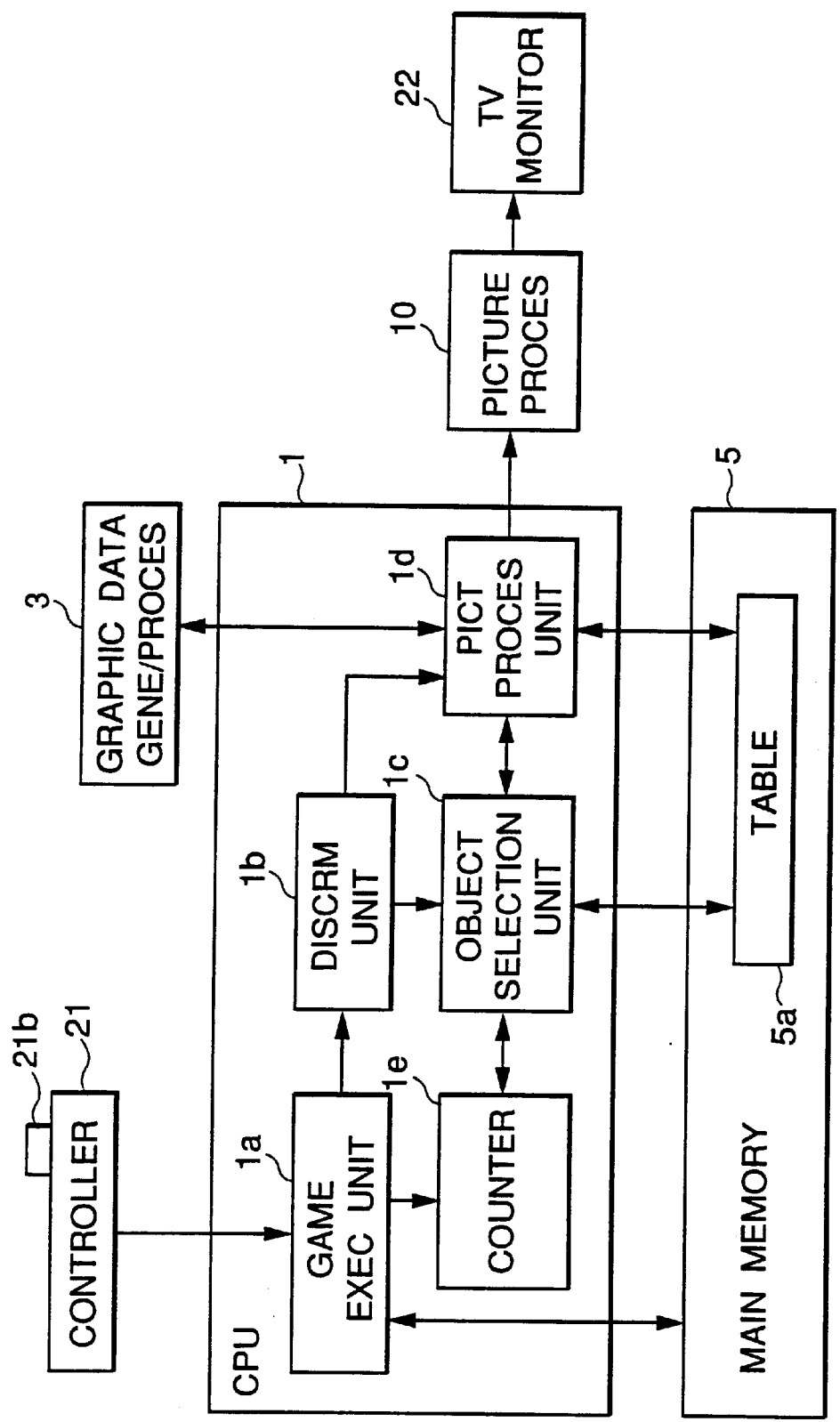
FIG. 4 is a function block diagram of the image display processing apparatus.

Next, the processing of the video game machine implementing the aforementioned image display processing method is described. FIG. 4 is a function block diagram showing a construction (image display processing apparatus) for performing the image display processing by the video game machine, and FIG. 5 is a diagram of a table 5a generated on the main memory.

As shown in FIG. 4, the CPU 1 implements the game program loaded in the main memory 5, thereby realizing a game executing unit 1a, a discriminating unit 1b, an object selecting unit 1c and a picture processing unit 1d. Further, the CPU 1 has a built-in counter 1e.

In the main memory 5, the table 5a for implementing the aforementioned image display processing method as the game program is loaded. As shown in FIG. 5, the coordinate transform data (absolute coordinate data of the polygons, the rotation amount data, the movement amount data, etc.) and the light source calculation data (vector data of rays and the normal line data of the polygon surfaces) of the aforementioned objects A1 to A9 are stored in the table 5a as shown in FIG. 5. The color palette address data and the texture address data are also stored in the table 5a.

Numbers corresponding to the numerical numbers of the objects are allotted to the respective objects A1 to A9 are also stored in the table 5a. In this case, the number assigned to each object is an integer such as 1–9. The numbers, 1–9, corresponding to the of the objects, are set to correspond to value of the counter 1e in this embodiment. Further, state flags for discriminating whether the objects A1 to A9 are displayed or not are stored. The state flags for the objects A to be displayed on the television monitor 22 are set at "0" and the state flag for the object A not to be displayed is set at "1". It should be noted, however, the state flags for the objects A that are not to be displayed may be plural in numbers.

Though unillustrated, tables for the picture processing of the field F, the sky S, the objects B1 to B3 representing logs, the objects b, and the objects C1, C2 representing characters are generated in the main memory 5, respectively. The respective tables include the coordinate transform data, the light source calculation data, the color palette address data and the texture address data.

The game executing unit 1a develops the game in accordance with the game program loaded in the main memory 5. At this time, the game executing unit 1a issues the coordinate transform command and the light source calculation command, of the objects corresponding to the display content of the frames, every frame to the discriminating unit 1b and transfers the total display data amount of one frame to the discriminating unit 1b (the game executing unit 1a corresponds to the issuance means).

The discriminating unit 1b has a threshold value for the total display data amount. This threshold value is set at a total display data amount of one frame which can be processed by the CPU 1, the graphic data generator/processor 3 and the picture processor 10. Upon the receipt of the coordinate transform command, the light source calculation command and the total display data command from the game executing unit 1b, the discriminating unit 1b compares the received total display data amount with the threshold value. If the total display data amount is below the threshold value, the discriminating unit 1b issues the coordinate transform command and the light source calculation command to the picture processing unit 1d. On the other hand, if the total display data amount is above the threshold value, the discriminating unit 1b issues the coordinate transform command and the light source calculation command to the object selecting unit 1c (the discriminating unit 1b corresponds to a monitoring means).

Upon the receipt of the coordinate transform command and the light source calculation command, the object selecting unit 1c refers to the value of the counter 1e. Subsequently, the object selecting unit 1c searches the table 5a to set the state flag, of the object A having a number corresponding to the value of the counter 1e, at "1" and set the state flags of the other objects A at "0" (the object selecting unit 1c corresponds to a selecting means). Then, the object selecting unit 1d issues the coordinate transform command and the light source calculation command to the picture processing unit 1d.

The counter 1e is used to select one of the objects A1 to A9 which is to be erased from the display content (the counter 1e corresponds to a selection information storing means). The initial value of the counter 1e is set at "9". Every time the object selecting unit 1c refers to the value of the counter 1e, the counter value is decremented by one. Further, the counter 1e is set such that the value thereof is set at "9" as an initial value when the counter value becomes "0". The value of the counter 1e is reset to "9" in response to a reset command suitably issued from the game executing unit 1a according to the development of the game.

Upon the receipt of the coordinate transform command and the light source calculation command from the discriminating unit 1b or the object selecting unit 1c, the picture processing unit 1d reads necessary data from the respective tables on the main memory 5 and transfers the read data to the graphic data generator/processor 3. At this time, the picture processing unit 1d sets all state flags in the table 5a at "0" when reading the data from the table 5a in the case of receiving the coordinate transform command and the light source calculation command from the discriminating unit 1b and transfers the data of the respective objects A1 to A9 to the graphic data generator/processor 3. On the other hand, the picture processing unit 1d reads only the data of the objects whose state flags are set at "0" when reading the data from the table 5a in the case of receiving the coordinate transform command and the light source calculation command from the object selecting unit 1c and transfers the read data to the graphic data generator/processor 3.

Upon the receipt of the results of the coordinate transform and the light source calculation (polygon apex address data and lightness data) from the graphic data generator/processor 3, the picture processing unit 1d transfers these data and the color palette address data and the texture address data read from the table 5a to the picture processor 10. At this time, the picture processing unit 1d reads only the color palette address data and the texture address data of the object(s) whose state flag(s) is/are set at "0" from the table 5a.

The graphic data generator/processor 3 performs the aforementioned coordinate transform and light source calculation and sends the processing results to the picture processing unit 1d.

In the non-display area of the buffer 11, the color palette address data and texture data of the objects A1 to A9, B1 to B3, b, C1, C2, the field F and the sky S are stored as the image data is read from the CD-ROM 23.

The picture processor 10 generates the display image data of one frame in the display area of the buffer 11 based on the data received from the picture processing unit 1d and the data stored in the non-display area of the buffer 11, and outputs the generated data to the television monitor 22.

Upon the receipt of the display image data developed in the display area of the buffer 11, the television monitor 22 displays a game screen on its display surface based on the display image data.

The processings performed by the picture processing unit 1d, the graphic data generator/processor 3 and the picture processor 10 correspond to the image processing means of the invention.

Figure 6:
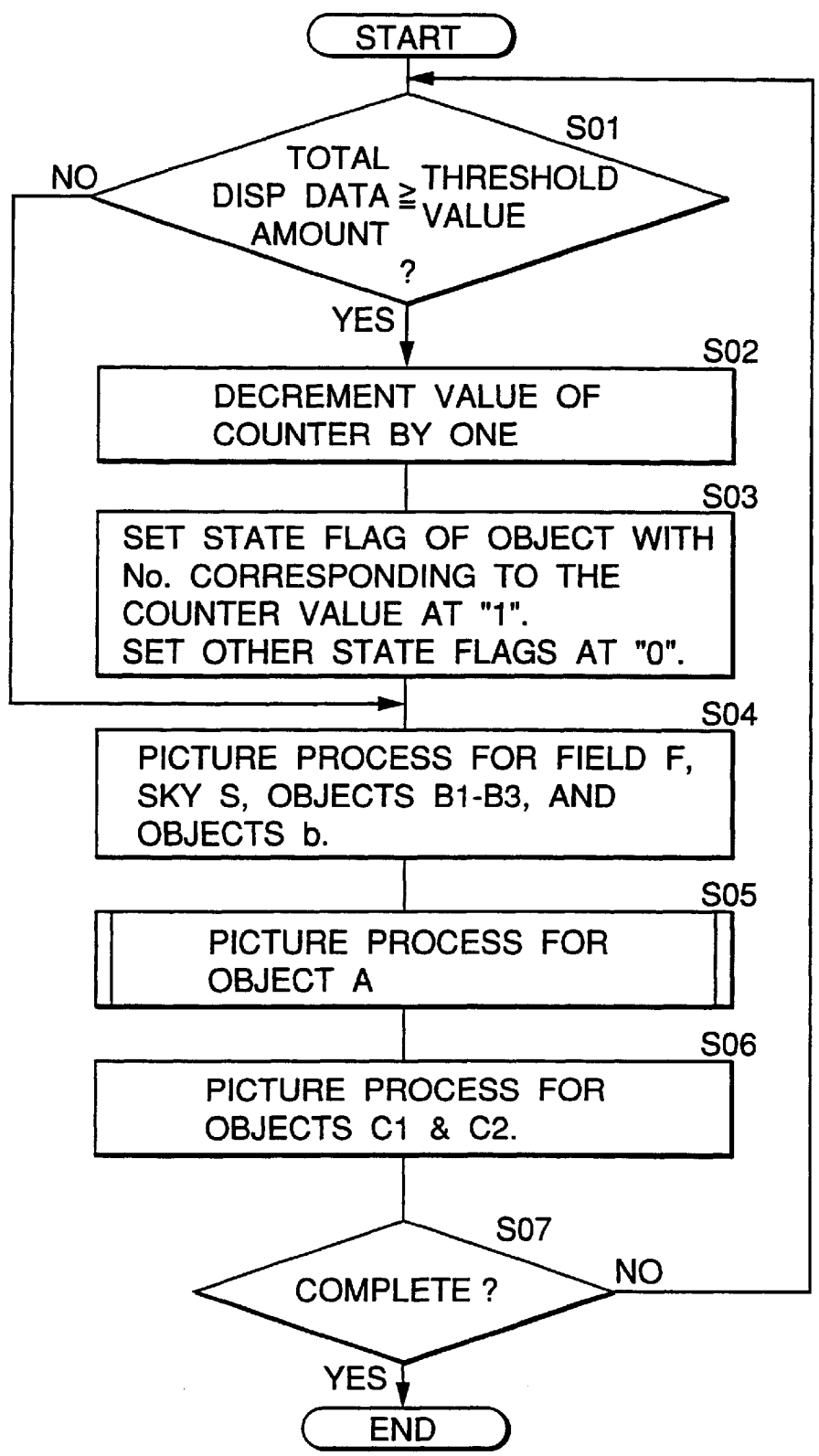

FIGS. 6 and 7 are a flow chart showing the image display processing by the video game machine. The game executing unit 1a causes an unillustrated title screen of the video game to be displayed on the display surface of the television monitor 22. When the start button 21b of the controller 21 is pressed while this unillustrated title screen is displayed, a command to display the game screen is given to the game executing unit 1a. Then, the game executing unit 1a gives the coordinate transform command of the respective objects (A1 to A9, B1 to B3, b, C1, C2, field F, sky S, etc.) constituting the game screen, the light source calculation command and the total display data amount to the discriminating unit 1b, frame by frame in order to display the game screens of the video game on the television monitor 22. In this way, the image display processing shown in FIGS. 6 and 7 is started. At this time, the value of the counter 1e is set at the initial value "9" by the game executing unit 1a.

In Step S01, the discriminating unit 1b compares the total display data amount of one frame received from the game executing unit 1a with a threshold value it has. At this time, if the total display data amount is below the threshold value (NO in Step S01), the discriminating unit 1b transfers the coordinate transform command and the light source calculation command to the picture processing unit 1d and Step S04 follows. If the total display data amount is equal to or larger than the threshold value (YES in Step S01), the discriminating unit 1b transfers the coordinate transform command and the light source calculation command to the object selecting unit 1c and Step S02 follows.

In Step S02, the object selecting unit 1c refers to the value of the counter 1c and decrements it by one. For example, if the value of the counter 1e is "9", it becomes "8" by the processing of Step S02. Then, Step S03 follows.

In Step S03, the object selecting unit 1c sets the state flag of the object having a number corresponding to the value of the counter 1e referred in Step S02 at "1" and the other state flags at "0" in the table 5a. At this time, if the value of the counter 1e is, for example, "9", the state flag of the object A1 to which the number "9" corresponding to the value of the counter 1e is allotted is set at "1" and the other state flags are set at "0". In this way, the object A1 is selected as an object not to be displayed in the game screen. Then, Step 04 follows.

In Step S04, the picture processing unit 1d performs the picture processing for the field F, the sky S, the objects B1 to B3 and the objects b in accordance with the coordinate transform command and the light source calculation command received from the discriminating unit 1b or object selecting unit 1c. Specifically, the picture processing unit 1d reads the coordinate transform data and the light source calculation data of the field F, the sky S, the objects B1 to B3 and the objects b from the unillustrated table for the picture processing on the main memory 5, and transfers them to the graphic data generator/processor 3. Thereafter, upon receiving the results of the coordinate transform and the light source calculation from the graphic data generator/processor 3, the picture processing unit 1d transfers them to the picture processor 10 together with the color palette address data and texture data of the field F, the sky S, the objects B1 to B3 and the objects b. Then, Step S05 follows.

By the processing of Step S05, the display image data of the field F, the sky S, the objects B1 to B3 and the objects b generated by the picture processor 10 are developed in the display area of the buffer 11. It should be noted that the number of the objects b increases and decreases according to the stage of the game.

In Step 05, a subroutine "Picture Processing of Object A" shown in FIG. 7 is executed. In Step S101 of this subroutine, it is discriminated whether the image processing unit 1d has received the coordinate transform command and the light source calculation command from the object selecting unit 1c. At this time, Step S103 follows if the respective commands have been received from the object selecting unit 1c (YES in Step S101), whereas Step S102 follows if otherwise (NO in Step S101). In Step S102, the image processing unit 1d sets the state flags of all objects, i.e. objects A1 to A9 in the table 5a at "0". Then, Step S103 follows.

In Step S103, the picture processing unit 1d reads the coordinate transform data and the light source calculation data of the objects A whose state flags are set at "0" from the table 5a and transfers them to the graphic data generator/processor 3. Accordingly, the data of the object A whose state flag is set at "1" is not transferred. For example, if the state flag of the object A1 is set at "1" in Step S03, the object A1 is not to be displayed in the game screen. Then, Step S104 follows.

By the processing of Step S103, the graphic data generator/processor 3 performs the coordinate transform and the light source calculation for the objects A and transfers the results of these processings, i.e. the polygon apex address data and the lightness data to the picture processing unit 1d.

In Step S104, the picture processing unit 1d stores the polygon apex address data and the lightness data transferred from the graphic data generator/processor 3 in the main memory 5. Then, Step S105 follows.

In Step S105, the discriminating unit 1b discriminates whether or not the coordinate transform and the light source calculation (processings in Steps S103 and S104) have been performed for all objects A whose state flags are set at "0". At this time, this subroutine returns to Step S103 to repeat the processings of Steps S103 to S105 until obtaining an affirmative discrimination result in Step S105 if the processings have not yet been performed for all such objects A (NO in Step S105), whereas Step S106 follows unless otherwise (YES in Step S105).

In Step S106, the picture processing unit 1d reads the coordinate transform data and the light source calculation data of the objects A whose state flags are set at "0" from the table 5a, and transfers the read data to the picture processor 10 together with the polygon apex address data and the lightness data stored in Step S104. Then, Step S107 follows.

In Step S107, it is discriminated whether the picture processing unit 1d has completely transferred the polygon apex address data, lightness data, color palette address data and texture address data of all the objects A whose state flags are set at "0". At this time, this subroutine returns to Step S106 to repeat the processings of Steps S106 and S107 until obtaining an affirmative discrimination result in Step S107 if all the data have not yet been transferred (NO in Step S107). If all the data have been transferred (YES in Step S107), this subroutine ends and Step S06 follows.

By the processing of Step S05, the display image data of the respective objects A are developed on the display image data of the field F, the sky S, the objects B1 to B3 and the objects b generated by the picture processor 10 in a superimposed manner in the display area of the buffer 11.

In Step S06, the picture processing unit 1d performs the picture processing for the objects C1 and C2. Specifically, the picture processing unit 1d reads the coordinate transform data and the light source calculation data of the objects C1 and C2 from the unillustrated table for the picture processing on the main memory 5, and transfers them to the graphic data generator/processor 3. Thereafter, upon receiving the polygon apex address data and the lightness data from the graphic data generator/processor 3, the picture processing unit 1d transfers them to the picture processor 10 together with the color palette address data and texture data of the objects C1, C2. Then, Step S07 follows.

In Step S07, it is discriminated whether the image display processing has been completed. At this time, this routine returns to Step S01 to repeat the processings of Step S01 to S07 until to obtain an affirmative discrimination result in Step S07 if it is discriminated that the image display processing has not yet been completed (NO in Step S07), whereas the image display ends unless otherwise (YES in Step S07).

By the processing of Step S06, the display image data of the objects C1, C2 are developed on the display image data of the field F, the sky S, the objects B1 to B3, the object b, and the respective objects A which were generated by the picture processor 10 in the display area of the buffer 11. The picture processor 10 outputs the content developed in the display area of the buffer 11 to the television monitor 22.

Thus, a game screen including the images of all the objects A1 to A9 is displayed on the display surface of the television monitor 22 in the case that the discrimination result in Step S101 is in the negative (see FIG. 2). On the other hand, in the case that the discrimination result in Step S101 is in the affirmative, for example, a game screen including the images of all the objects A but A1 is displayed (see FIG. 3A).

Thereafter, for example, if the discrimination result in Step S101 is in the affirmative, the object A2 corresponding to the value "8" of the counter 1e is selected as an object to be excluded from the display content in Step S03. After the processings of Steps S04 to S06, a game screen including the images of all the objects A but A2 is displayed on the display surface of the television monitor 22 (see FIG. 3B). In this way, the value of the counter 1e is decremented, and the object A corresponding to the value of the counter 1e is excluded from the display content. Thus, the game screen from which any one of the objects A1 to A9 is successively erased is displayed on the television monitor 22 every frame (see FIGS. 3C, 3D).

On the other hand, if the discrimination result in Step S01 is in the affirmative after the completion of the processing of Step S06, all the state flags in the table 5a are set at "0" in Step S102. Accordingly, the game screen including the images of all the objects A1 to A9 is displayed again on the television monitor 22.

Summing up the aforementioned disclosure regarding this invention, this invention is directed to an image display processing apparatus which comprises issuance means for issuing a display content of one frame including images of a plurality of objects to be displayed on a screen; monitoring means for detecting a display content having a data amount in excess of a predetermined value; selection means for selecting at least one of the plurality of objects included in the display content; and image processing means for processing an image for the display content excluding the image of the object selected by the selection means and displaying the processed image on the screen.

With the above construction, the monitoring means monitors whether or not the data amounts of the display contents issued by the issuance means exceed the predetermined value. In the case of detecting the display content whose data amount exceeds the predetermined value, the selection means selects at least one of the plurality of objects included in the detected display content. Then, the image processing means applies the image processing to the detected display content excluding the image of the selected object and the processed display content is displayed on the screen. Accordingly, a processing load on the image display processing apparatus can be reduced by the image data of the selected object. Therefore, the data amount of the display content can be suppressed within the range processable by the image display processing apparatus.

Here, it is preferable that the display content be a virtual three-dimensional space and the plurality of objects be objects constituting the background of the virtual three-dimensional space. Further, the plurality of objects are preferably arranged in inconspicuous positions of the screen. The plurality of objects may be of the same kind or of different kinds. Furthermore, it does not matter how many objects are selected at once, but the number of the objects to be selected at once is preferably below the half of the total number of the objects.

Preferably, the selection means selects at least one of the plurality of objects included in one display content and selects an object having not yet been selected from the plurality of objects included in the other display content in the case that the monitoring means has detected the display contents, in series, having the same plurality of objects, and the image processing means applies the image processing to the respective display contents detected by the monitoring means excluding the objects selected by the selection means.

With this construction, the display contents displayed on the screen after the processing by the image processing means do not include different objects, respectively. In other words, the object excluded in the previous frame is included again in the display content in the next frame. Accordingly, if the setting is such that the objects to be excluded, i.e. the objects not to be displayed on the screen differ in the case that the same display content is continuously displayed on the screen, the image of the object disappears from the screen for only a time corresponding to a period during which one frame is displayed. This makes it difficult for the game player to notice the disappearance of the object from the screen.

Preferably, there is further provided a selection information storage means for storing a selection order of the plurality of objects, and the selection means selects at least one of the plurality of objects in accordance with the selection order stored in the selection information storage means.

With this construction, since the plurality of objects can be excluded from the display content in the predetermined order while a plurality of frames are displayed, it is more difficult for the game player to notice the disappearance of the objects from the screen.

The invention is also directed to an image display processing method, comprising the steps of: issuing a display content of one frame including images of a plurality of objects to be displayed on a screen; detecting a display content having a data amount in excess of a predetermined value from the issued display contents; selecting at least one of the plurality of objects included in the detected display content, and processing image for the detected display content excluding the image of the selected object and displaying the processed image on the screen.

The invention is further directed to a readable storage medium for storing a program for an image display processing which is executable on a computer, wherein the program causes the computer to execute the steps of: issuing a display content of one frame including images of a plurality of objects to be displayed on a screen; detecting a display content having a data amount in excess of a predetermined value; selecting at least one of the plurality of objects included in the detected display content; processing an image of the detected display content excluding the image of the selected object; and displaying the processed image on the screen.

Here, the storage mediums include a ROM, a RAM, a CD-ROM, a hard disk, a photomagnetic disk, a floppy disk, etc.

According to the image display processing apparatus, the image display processing method and the readable storage medium storing a computer program of the embodiment, the total display data amount of one frame is monitored by the game executing unit 1a and the discriminating unit 1b. If the total display data exceeds the threshold value, any one of the objects A1 to A9 constituting the background of the game screen is excluded from the display content. Since the total display data amount is reduced in this way, the total display data amount of one frame can be suppressed within the range processable by the picture processing unit 1d, the graphic data generator/processor 3 and the picture processor 10. Accordingly, the flickering and twisting of the screen due to the blinking of the objects in the game screen can be prevented.

Further, the period during which any one of the objects A1 to A9 disappears is a time during which one frame is displayed. Thus, the game player does not notice the disappearance of the object.

Although any one of the objects A1 to A9 is excluded from the display content in this embodiment, two or more objects A may be excluded from the display content of one frame. Further, although the order of the objects A to be excluded from the display content is predetermined in this embodiment, the object(s) A to be excluded from the display content may be randomly selected. It is, however, desirable not to continuously select the same object A.

Furthermore, although the action game is described as a video game in this embodiment, the inventive image display processing method may be applied to a video game machine implementing a roll playing game, an adventure game or the like.

Further, although the home video game machine is described in this embodiment, the video game machine may be constructed for a business use. In this case, all the elements shown in FIG. 1 are contained as a unit in a single container. The video game machine may be also constructed using a computer such as a personal computer or a work station as a core. In this case, the television monitor 22 corresponds to a computer display; the picture processor 10, the audio processor 12 and the expansion circuit 7 correspond to hardware on an extension board mounted in an extension slot of the computer; and the interface circuit 4, the parallel port 8, the serial port 9, the interface circuit 19 correspond to hardware on another extension board mounted in an extension slot of the computer. Further, the buffers 11, 13, 15 correspond to the main memory 5 or the respective areas of an unillustrated extension memory.

As described above, the blinking of the objects displayed on the monitor, the twisting of the screen, etc. can be prevented according to the image display processing apparatus and method and the readable storage medium storing a computer program.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed:

1. An image display processing apparatus, comprising:
   issuance means for issuing a display content of each of a series of frames including images of a plurality of objects to be displayed on a screen;
   monitoring means for detecting whether the display content has a data amount in excess of a predetermined value;
   a counter for determining a count value;
   a memory for storing flags assigned to respective ones of the plurality of objects based on the count value;
   a memory for storing numbers assigned to respective ones of the plurality of objects;
   a flagging unit for assigning a predetermined indicia to one of the flags assigned to a respective one of the plurality of objects with a one of the numbers assigned equal to the count value;
   selection means for selecting at least one of the plurality of objects included in a display content having a data amount in excess of the predetermined value based on the flags; and
   image processing means for removing the object selected by the selection means from the display content of one frame, and for processing an image based on the display content without the image of the object selected by the selection means and displaying the processed image on the screen without the image of the object selected by the selection means.

2. The image display processing apparatus according to claim 1, wherein:
   the selection means selects the at least one of the plurality of objects included in one display content and, from another display content in the series of frames, selects another one of the plurality of objects which has not yet been selected from the plurality of objects; and the image processing means processes the respective display contents detected by the monitoring means excluding the objects selected by the selection means.

3. The image display processing apparatus according to claim 1, further comprising a selection information storage means for storing a selection order of the plurality of objects, wherein the selection means selects at least one of the plurality of objects in accordance with the selection order.

4. The image display processing apparatus according to claim 1, wherein the display content is in virtual 3-D form and the plurality of objects are objects constituting a background.

5. The image display processing apparatus according to claim 1, further comprising:
   a memory for storing numbers assigned to respective ones of the plurality of objects; and
   the selection means selecting the one of the plurality of objects having a number corresponding to the count value of the courter.

6. The image display processing apparatus according to claim 1, wherein the count value in the counter is decremented at each time an object is selected by the selection means.

7. The image display processing apparatus according to claim 1, wherein the count value stored in the counter is a positive integer and is decremented by 1 at each time an object is selected by the selection means.

8. The image display processing apparatus according to claim 5, wherein the count value stored in the counter is randomly changed.

9. The image display processing apparatus according to claim 1, wherein the count value stored in the counter is incremented at each time an object is selected by the selection means.

10. The image display processing apparatus according to claim 1, wherein the flagging unit includes means for assigning another predetermined indicia to flags assigned to a respective one of the plurality of objects with ones of the numbers assigned that are not equal to the count value.

11. The image display processing apparatus according to claim 10, wherein the selection means selects the object having the flag assigned the predetermined indicia.

12. The image display processing apparatus according to claim 11, wherein the predetermined indicia is a value "1" and the another predetermined indicia is a value "0".

13. An image display processing method, comprising the steps of:
   issuing a display content of each of a series of frames including images of a plurality of objects to be displayed on a screen;
   detecting whether the display content has a data amount in excess of a predetermined value;
   determining a count value;
   storing flags assigned to respective ones of the plurality of objects based on the count value;
   storing numbers assigned to respective ones of the plurality of objects;
   assigning a predetermined indicia to one of the flags assigned to a respective one of the plurality of objects with a one of the numbers assigned equal to the count value;
   selecting at least one of the plurality of objects included in a display content having a data amount in excess of the predetermined value based on the flags;
   processing an image for the detected display content excluding processing of an image of the selected object, and
   displaying the processed image on the screen without the image of the selected object.

14. The image display processing method according to claim 13, wherein the selection step selecting the object which is assigned one of the numbers corresponding to the count value.

15. The image display processing method according to claim 14, wherein the count value is stored in a counter and is changeable.

16. The image display processing method according to claim 13, further comprising a judging step for judging whether a display content is detected as having a data amount in excess of the predetermined value.

17. The image display processing method according to claim 16, further comprising a processing step for processing an image for all the display content if the judging step judges that the display content does not have a data amount in excess of the predetermined value.

18. A readable storage medium for storing an executable program for a computer to perform image display processing, the program directing the computer to execute the steps of:
   issuing a display content of each of a series of frames including images of a plurality of objects to be displayed on a screen;
   detecting whether the display content has a data amount in excess of a predetermined value;
   determining a count value;
   storing flags assigned to respective ones of the plurality of objects based on the count value;
   storing numbers assigned to respective ones of the plurality of objects;
   assigning a predetermined indicia to one of the flags assigned to a respective one of the plurality of objects with a one of the numbers assigned equal to the count value;
   selecting at least one of the plurality of objects included in a display content having a data amount in excess of the predetermined value based on the flags;
   processing an image for the detected display content excluding processing of an image of the selected object, and
   displaying the processed image on the screen without the image of the selected object.

* * * * *